(12) United States Patent
King, Jr. et al.

(10) Patent No.: US 6,193,254 B1
(45) Date of Patent: Feb. 27, 2001

(54) SOUND PRODUCING GENERATOR FOR BICYCLE

(76) Inventors: Ormonde L. King, Jr., 109 Hamilton Ave.; Michael J. Morgan, 12 Lake Ave., both of Auburn, NY (US) 13021

( * ) Notice: Subject to any disclaimer, the term of this patent is extended or adjusted under 35 U.S.C. 154(b) by 0 days.

(21) Appl. No.: 09/303,459

(22) Filed: Apr. 30, 1999

(51) Int. Cl.$^7$ .................................................. A63H 5/00
(52) U.S. Cl. ...................... 280/288.4; 280/1.14; 446/444
(58) Field of Search ................... 280/288.4, 200, 280/1.14, 304.2; D12/114, 213; 180/227; 446/397, 404, 414, 415; 359/523, 524, 533

(56) References Cited

U.S. PATENT DOCUMENTS

| | | |
|---|---|---|
| D. 319,617 | 9/1991 | Sorensen . |
| 597,829 | 1/1898 | Heilborn . |
| 660,229 | 10/1900 | Stratton et al. . |
| 2,578,682 | 12/1951 | Fernstrom . |
| 2,852,886 | 9/1958 | Parker . |
| 2,894,357 | 7/1959 | Munro . |
| 3,266,455 | 8/1966 | Cohn . |
| 3,439,926 | 4/1969 | Bayard . |
| 3,684,347 | 8/1972 | Challe et al. . |
| 3,754,350 | 8/1973 | Gorke . |
| 3,827,178 | 8/1974 | Warneke . |
| 4,018,450 | 4/1977 | Rutledge . |
| 4,099,738 | 7/1978 | Allen . |
| 4,145,989 | 3/1979 | Hatcher . |
| 4,466,630 | 8/1984 | Larkin . |
| 4,875,885 | 10/1989 | Johnson . |
| 5,314,372 | 5/1994 | Kramer . |
| 5,611,558 | 3/1997 | Randmae . |
| 5,652,677 | * 7/1997 | Burison . |

* cited by examiner

*Primary Examiner*—Robert J. Oberleitner
*Assistant Examiner*—C. T. Bartz
(74) *Attorney, Agent, or Firm*—Wall Marjama & Bilinski

(57) ABSTRACT

A noise-producing accessory for a bicycle includes a body member having a flexible flap section at one end thereof. The body member is mounted to the bicycle frame such that the flexible flap section can be positioned into frictional contact with the external diameter of a bicycle tire to produce a realistic moto-cross type sound as the tire rotates. Preferably, at least a portion of a facing surface of the accessory is reflective such that the accessory can be used both as the standard rear reflector of a bicycle and a motocross sound generator. Preferably, the accessory can assume a variety of different shapes.

12 Claims, 1 Drawing Sheet

SOUND PRODUCING GENERATOR FOR BICYCLE

FIELD OF THE INVENTION

This invention relates to the field of bicycle accessories, and more particularly to a bicycle accessory which simulates a motocross-like sound while serving a dual function as a standard bicycle reflector.

BACKGROUND OF THE INVENTION

A number of bicycle accessories have been developed for young children who wish to emulate riding or operating motorcycles and other similar motorized vehicles. In an earliest form, it was determined that playing cards held by clothespins or other supports inserted between the stokes of a bicycle tire could create a motorcycle like sound.

Later versions, such as those described in U.S. Pat. No. 5,611,558 to Randmae, U.S. Pat. No. 3,827,178 to Warneke, and U.S. Pat. No. 2,894,357 to Munro, each describe an accessory having a flap or other shaped portion which directly engages with the spokes of a bicycle wheel and produces a repeatable sound when the spokes interact with the flap.

It has been found, however, that spoke engagement can have a deleterious effect on the bicycle wheels, wherein the spokes may prematurely break due to repeated contact with the flap-like portions of these assemblies.

A number of other accessory mechanisms for this purpose, such as those described in U.S. Pat. No. 3,754,350 to Gorke, U.S. Pat. No. 2,578,682 to Fernstrom, and U.S. Pat. No. 4,099,738 to Allen utilize engagement with the exterior of the bicycle wheel. These mechanisms, however, are fairly complex in nature requiring sophisticated forms of attachment to the bicycle frame or wheel.

There is a perceived need to provide a simple and effective sound-producing accessory which does not engage the spokes of a bicycle wheel.

SUMMARY OF THE INVENTION

It is a primary object of the present invention to improve the state of the art of bicycle accessories.

It is another primary object of the present invention to provide a simple noise-simulating bicycle accessory which is not complex in terms of attachment and/or manufacture.

It is another primary object of the present invention to provide a bicycle accessory having a minimum number of parts.

It is yet another primary objective of the present invention to provide a bicycle accessory which can adequate perform a number of functions simultaneously.

Therefore and according to a preferred aspect of the invention, there is provided a sound-producing accessory for a bicycle, the accessory comprising:

a body member having a dependent flexible flap section at one end thereof; and means for mounting the body member to a bicycle frame, wherein the flexible flap section can be positioned in frictional contact with the circumferential exterior of a bicycle tire to produce a realistic motocross type sound, and in which a portion of a facing surface of the body member is reflective.

Preferably, the body member can be releasably mounted to the rear of the bicycle frame and serve a dual function as a standard bicycle reflector.

A feature of the present invention is that the body member includes a slitted opening which permits linear adjustment after the accessory has been mounted to the bicycle frame. This adjustment can alter the desired amount of frictional engagement of the flexible flap member with the bicycle wheel.

In a preferred version, the body member can assume a variety of different pleasing shapes (e.g., an animal, bird, or other convenient form) in which the body member and flexible flap section are integrally manufactured from a molded plastic material.

The flexible flap section preferably include a series of adjacent individual ribbed members having gaps therebetween permitting air to pass therethrough, while the flap section engages the exterior diameter of the tire.

According to another preferred aspect of the invention, there is disclosed:

a multi-purpose bicycle reflector, said reflector including a body member at least a portion of which is reflectorized, said body member including a flexible flap section at one end thereof, and means for mounting said body member such that the flexible flap section can be positioned in frictional contact relative to the exterior of a bicycle tire to produce a realistic moto-cross type sound when the bicycle tire rotates.

An advantage of the present invention is that an effective moto-cross sound can easily be realized with a relatively simple assembly.

A further advantage of the present invention is that the described bicycle accessory is easily adjustable, and is as reliable as previously known prior art accessories.

Still a further advantage is that the described accessory can further serve as a mud flap.

Yet another advantage is that the accessory is easily and releasably attached to the bicycle frame and preferably uses the same mounting hole used by standard bicycle reflectors. Moreover, this accessory is no more expensive than a typically known bicycle reflector while providing increased functionality.

These and other objects, features and advantages will be readily apparent from the following Detailed Description which should be read in conjunction with the accompanying drawings.

BRIEF DESCRIPTION OF THE DRAWING

For a fuller understanding of the nature and objects of the invention, reference should be made to the following detailed description of a preferred mode of practicing the invention, read in connection with the accompanying drawings, in which.

DETAILED DESCRIPTION

Figure 1:
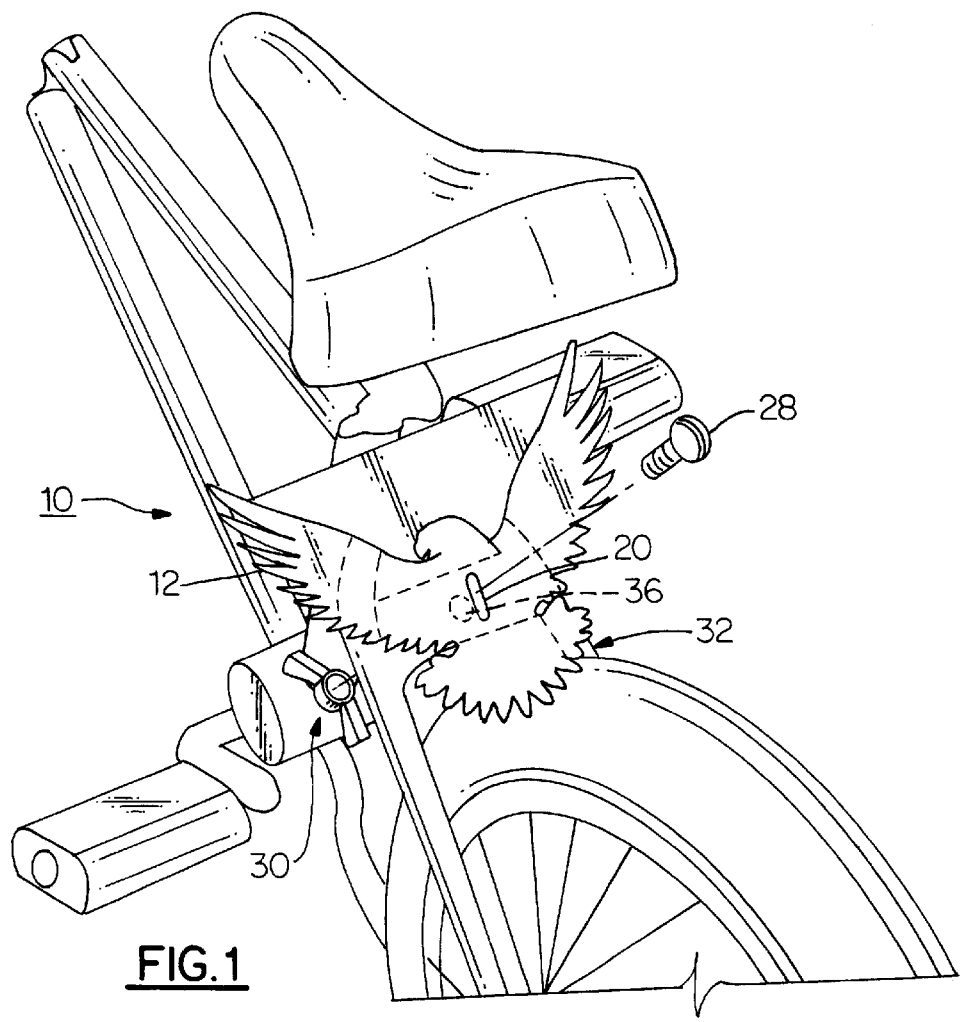
FIG. 1 is a partial rear perspective view of a bicycle including a releasably attachable motocross sound-producing accessory made in accordance with a preferred embodiment of the invention.
Figure 2:
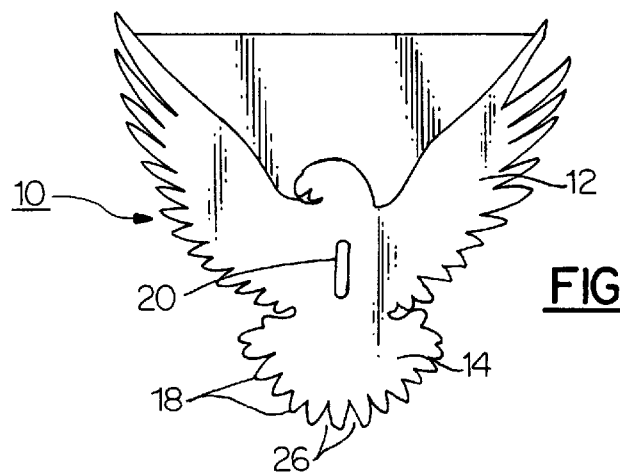
FIG. 2 is a side elevational view of the sound-producing accessory of FIG. 1.

Referring to FIGS. 1 and 2, there is shown a bicycle accessory identified throughout by reference number 10 in accordance with the present invention.

The bicycle accessory 10 is defined by a unitary body member 12 made from a flexible moldable plastic, such as polycarbonate, polyethylene or other suitable material. In the present embodiment, the body member 12 is molded into the shape of an American eagle, though it should be readily apparent to one of sufficient skill that the accessory can assume literally any convenient shape.

One depending end of the unitary body member 12 includes a flexible flap section 14, also made from a moldable plastic, which in keeping with the present eagle configuration, includes a plurality of tail feathers 18, each having a small gap 26 defined between adjacent feathers.

The unitary body member 12 includes a slit-like opening 20 located approximately in the center thereof which allows a threaded fastener, such as a bolt 28, and a corresponding wingnut 30 to secure the body member 12 to the rear of a bicycle frame 32, partially shown. According to this embodiment, the accessory 10 is attached in place of a standard bicycle reflector (not shown) and utilizes an attachment hole 36 typically used for this purpose. At least a portion of the facing surface 24 of the body member 12 is also preferably made from, or is coated or painted with, a light-reflective material allowing the accessory 10 to function as a sound-producing device as well as a standard bicycle reflector.

In operation, the assembly 10 is assembled in a toolless fashion to the bicycle frame 32 and adjusted using the fastener and wingnut combination 28, 30 such that the tail feathers 18 are in substantial contact with the exterior diameter of the bicycle wheel or tire 34, the tire having a plurality of spaced nubs or raised surfaces (not shown). As the bicycle wheel 34 rotates, the feathers 18 cause the tail feathers to oscillate against the protruding nubs (not shown) of the wheel and produce a motocross-like sound. Additionally, air passing through the gaps 26 between the feathers 18 contributes to the sound-producing features of the accessory 10.

It has been noted that accessory 10 can assume a varied number of shapes. These shapes need not necessarily include the gaps provided in the described embodiment and can therefore rely solely upon the frictional contact between the flap section 14 and the wheel exterior to produce an suitable sound. In addition, varying the amount of engagement of the tail feathers 18 with the exterior of the wheel 34 will allow selective modifications to the magnitude and quality of the sound which is produced.

In the meantime, the reflective facing surface 24 of the body member 12 allows the accessory 10 to function as a standard bicycle reflector enabling proper safety as well as duality of function in a single assembly that can be retrofitted onto existing bicycle frames with literally no modification to the frame being required.

Finally, the accessory 10 provides another function in that the proximity of the flexible tail section 14 to the exterior of the bicycle tire 34 also functions as a mud flap.

Though the present invention has been described in terms of a single preferred embodiment it will be readily apparent that variations and modifications are possible which are within the spirit and scope of the invention as defined by the following claims. For example, and though the preceding embodiment describes a rear frame mounting scheme, it should be apparent that other positions, such as the front of the frame, can be selected which accommodate the dual functionality of the accessory. Additionally, the described assembly can be used with literally any form of bicycle and bicycle tire.

We claim:

1. In combination, a sound-producing accessory and a bicycle, said bicycle including a frame and a pair of bicycle tires attached to said frame at respective front and rear sides thereof, said sound-producing accessory comprising:

a plastic body member including a flexible flap at one end thereof; and means for mounting said body member to one of front and rear sides of said bicycle frame in lieu of one of a front side and rear side bicycle reflector, said mounting means permitting said flexible flap to be adjustably positioned in frictional contact with the exterior of one of said bicycle tires to produce a distinctive sound, at least a substantial portion of said body member being reflective, said mounting means including a slotted hole defined in said body member aligned with an attachment hole provided on one of the front and rear side of said bicycle frame permitting adjustable movement of said body member and said flexible flap in relation to the exterior of one of said bicycle tires.

2. An accessory according to claim 1, wherein said flexible flap acts as a mud flap.

3. An accessory according to claim 1, wherein said accessory is releasably attached to said bicycle frame.

4. An accessory according to claim 1 wherein said accessory is made from a moldable plastic.

5. An accessory according to claim 1, wherein a distal portion of said flexible flap includes a series of ridges for engaging the exterior of the bicycle tire.

6. A multi-purpose bicycle reflector, said reflector including:

a reflective body member including a flexible flap section at one end thereof; and means for adaptively mounting said body member to at least one of the front and rear sides of a bicycle frame only in the position of and in lieu of a front side and a rear side bicycle reflector wherein the flexible flap section is adapted to be positioned in frictional contact relative to the exterior of a bicycle tire to produce a distinctive sound when the bicycle tire rotates and in which said mounting means includes a slotted hole defined in said body member which is adapted to be aligned with an attachment hole on one of the front and rear side of said frame said attachment hole being used for mounting a front side and a rear side bicycle reflector and said slotted hole permitting selective adjustment of said body member and said flexible flap in relation to one of the bicycle tires.

7. A reflector according to claim 6, wherein said reflector is releasably attachable to the bicycle frame.

8. A reflector according to claim 6, wherein said body member is in the shape of an animal.

9. A reflector according to claim 6, wherein said body member is in the shape of an eagle.

10. A reflector according to claim 9, wherein said flexible flap section includes a ridged section configured for engaging the bicycle tire, said ridged section resembling a set of tail feathers.

11. A reflector according to claim 6, wherein said body member is made from a moldable plastic.

12. A reflector according to claim 6, wherein a distal portion of said flexible flap includes a series of ridges for engaging the bicycle tire.

* * * * *